(12) United States Patent
Keith et al.

(10) Patent No.: US 8,834,056 B2
(45) Date of Patent: Sep. 16, 2014

(54) BIPOD FLEXURE RING

(71) Applicant: The Boeing Company, Chicago, IL (US)

(72) Inventors: William P. Keith, Lakewood, CA (US); Michael L. Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/649,770

(22) Filed: Oct. 11, 2012

(65) Prior Publication Data
US 2013/0034378 A1 Feb. 7, 2013

Related U.S. Application Data

(60) Continuation of application No. 12/783,599, filed on May 20, 2010, now Pat. No. 8,328,453, which is a division of application No. 11/851,622, filed on Sep. 7, 2007, now abandoned.

(51) Int. Cl.
C04B 37/02 (2006.01)
F01D 25/24 (2006.01)
F02K 1/00 (2006.01)

(52) U.S. Cl.
CPC .............. F01D 25/243 (2013.01); F02K 1/00 (2013.01); F05D 2250/18 (2013.01); F05D 2230/642 (2013.01); F05B 2240/92 (2013.01)
USPC .......................................................... 403/30

(58) Field of Classification Search
USPC .......... 403/30, 291, 336, 337, 408.1, 50, 134; 60/796, 799, 800; 411/503
See application file for complete search history.

(56) References Cited

U.S. PATENT DOCUMENTS

| 2,615,300 | A | | 10/1952 | Lombard | |
|---|---|---|---|---|---|
| 3,701,704 | A | | 10/1972 | Dervy | |
| 3,826,708 | A | | 7/1974 | Dervy | |
| 3,962,843 | A | * | 6/1976 | King, Jr. | ............ 403/243 |
| 3,985,000 | A | | 10/1976 | Hartz | |
| 4,004,887 | A | * | 1/1977 | Stormont | ............ 422/179 |

(Continued)

FOREIGN PATENT DOCUMENTS

| EP | 1439350 | 7/2004 |
|---|---|---|
| EP | 1607582 | 12/2005 |
| EP | 1775517 | 4/2007 |
| FR | 2875854 | 3/2006 |

OTHER PUBLICATIONS

United States Patent and Trademark Office, "Final Office Action," issued in connection with U.S. Appl. No. 11/851,667, mailed Sep. 6, 2012, 37 pages.

(Continued)

Primary Examiner — Joshua Kennedy
(74) Attorney, Agent, or Firm — Hanley, Flight & Zimmerman, LLC

(57) ABSTRACT

A thermal coupling includes a first structure having a first coefficient of thermal expansion; a second structure having a second coefficient of thermal expansion lower than the first coefficient of thermal expansion; a plurality of thermal expansion fingers provided in the first structure; a plurality of thermal expansion flanges extending from the plurality of thermal expansion fingers, respectively; and a flange extending from the second structure and attached to the plurality of thermal expansion flanges.

12 Claims, 3 Drawing Sheets

(56) References Cited

U.S. PATENT DOCUMENTS

| | | | |
|---|---|---|---|
| 4,076,451 A * | 2/1978 | Jankot | 415/209.2 |
| 4,227,370 A | 10/1980 | Kirker | |
| 4,438,956 A | 3/1984 | Jones et al. | |
| 4,552,386 A | 11/1985 | Burchette | |
| 4,907,743 A * | 3/1990 | Bouiller et al. | 239/265.11 |
| 4,910,620 A | 3/1990 | Olbrich | |
| 5,013,174 A * | 5/1991 | Marabotto et al. | 403/11 |
| 5,074,697 A * | 12/1991 | Blanpain et al. | 403/28 |
| 5,141,393 A * | 8/1992 | Marra | 415/138 |
| 5,147,151 A * | 9/1992 | Hipkins, Jr. | 405/259.1 |
| 5,230,539 A | 7/1993 | Olson | |
| 5,445,469 A * | 8/1995 | Huck et al. | 403/30 |
| 5,503,490 A | 4/1996 | Melton | |
| 5,504,798 A | 4/1996 | Suzuki | |
| 5,645,363 A | 7/1997 | Dafforn et al. | |
| 5,984,568 A | 11/1999 | Lohbeck | |
| 6,106,184 A * | 8/2000 | Daniels et al. | 403/282 |
| 6,158,961 A | 12/2000 | Kehl et al. | |
| 6,173,996 B1 | 1/2001 | Derakhshan et al. | |
| 6,179,559 B1 | 1/2001 | Weaver | |
| 6,212,753 B1 | 4/2001 | Derakhshan et al. | |
| 6,540,899 B2 | 4/2003 | Keigler | |
| 6,607,328 B1 * | 8/2003 | Treiber et al. | 403/408.1 |
| 6,644,034 B2 * | 11/2003 | Ariyoshi et al. | 60/800 |
| 6,658,853 B2 * | 12/2003 | Matsuda et al. | 60/753 |
| 6,668,559 B2 * | 12/2003 | Calvez et al. | 60/796 |
| 6,708,495 B2 * | 3/2004 | Calvez et al. | 60/753 |
| 6,759,386 B2 | 7/2004 | Franco | |
| 6,775,985 B2 * | 8/2004 | Mitchell et al. | 60/772 |
| 6,904,757 B2 * | 6/2005 | Mitchell et al. | 60/800 |
| 7,017,350 B2 | 3/2006 | De Sousa et al. | |
| 7,234,306 B2 * | 6/2007 | Aumont et al. | 60/796 |
| 7,237,387 B2 | 7/2007 | Aumont et al. | |
| 7,237,388 B2 * | 7/2007 | Aumont et al. | 60/796 |
| 8,141,370 B2 | 3/2012 | Bulman et al. | |
| 8,328,453 B2 | 12/2012 | Keith et al. | |
| 8,424,312 B2 * | 4/2013 | Conete et al. | 60/796 |
| 8,459,941 B2 * | 6/2013 | Jasko et al. | 415/190 |
| 2002/0108378 A1 * | 8/2002 | Ariyoshi et al. | 60/800 |
| 2003/0091386 A1 * | 5/2003 | Ting | 403/408.1 |
| 2006/0010879 A1 * | 1/2006 | Aumont et al. | 60/796 |
| 2006/0032236 A1 * | 2/2006 | Aumont et al. | 60/796 |
| 2006/0032237 A1 | 2/2006 | Aumont et al. | |
| 2007/0240423 A1 | 10/2007 | Bulman et al. | |
| 2008/0115484 A1 | 5/2008 | Conete et al. | |
| 2009/0064681 A1 * | 3/2009 | Keith et al. | 60/770 |
| 2009/0067917 A1 | 3/2009 | Keith et al. | |
| 2010/0227698 A1 | 9/2010 | Keith et al. | |
| 2013/0223982 A1 * | 8/2013 | Durocher et al. | 415/12 |

OTHER PUBLICATIONS

United States Patent and Trademark Office, "Non-Final Office Action," issued in connection with U.S. Appl. No. 11/851,667, mailed Apr. 9, 2012, 17 pages.

United States Patent and Trademark Office, "Final Office Action," issued in connection with U.S. Appl. No. 11/851,622, mailed Mar. 23, 2010, 22 pages.

United States Patent and Trademark Office, "Non-Final Office Action," issued in connection with U.S. Appl. No. 11/851,622, mailed Oct. 26, 2009, 14 pages.

United States Patent and Trademark Office, "Advisory Action," issued in connection with U.S. Appl. No. 11/851,622, mailed Sep. 17, 2009, 4 pages.

United States Patent and Trademark Office, "Final Office Action," issued in connection with U.S. Appl. No. 11/851,622, mailed Jul. 8, 2009, 17 pages.

United States Patent and Trademark Office, "Non-Final Office Action," issued in connection with U.S. Appl. No. 11/851,622, mailed Jan. 8, 2009, 15 pages.

United States Patent and Trademark Office, "Restriction Requirement," issued in connection with U.S. Appl. No. 11/851,622, mailed Nov. 14, 2008, 8 pages.

United States Patent and Trademark Office, "Final Office Action," issued in connection with U.S. Appl. No. 11/851,667, mailed Jul. 12, 2011, 19 pages.

United States Patent and Trademark Office, "Non-Final Office Action," issued in connection with U.S. Appl. No. 11/851,667, mailed Feb. 3, 2011, 14 pages.

European Patent Office, "European Search Report," issued in connection with European application serial No. 08163806.6, issued Mar. 19, 2012, 7 pages.

European Patent Office, "European Search Report," issued in connection with European application serial No. 08163818.1, issued Mar. 26, 2012, 7 pages.

United States Patent and Trademark Office, "Notice of Allowance," issued in connection with U.S. Appl. No. 12/783,599, mailed Aug. 14, 2012, 21 pages.

United States Patent and Trademark Office, "Final Office Action," issued in connection with U.S. Appl. No. 12/783,599, mailed Apr. 13, 2012, 16 pages.

United States Patent and Trademark Office, "Non-Final Office Action," issued in connection with U.S. Appl. No. 12/783,599, mailed Dec. 28, 2011, 13 pages.

United States Patent and Trademark Office, "Advisory Action," issued in connection with U.S. Appl. No. 12/783,599, mailed Nov. 29, 2011, 4 pages.

United States Patent and Trademark Office, "Final Office Action," issued in connection with U.S. Appl. No. 12/783,599, mailed Aug. 25, 2011, 12 pages.

United States Patent and Trademark Office, "Non-Final Office Action," issued in connection with U.S. Appl. No. 12/783,599, mailed May 13, 2011, 20 pages.

United States Patent and Trademark Office, "Notice of Allowance," issued in connection with U.S. Appl. No. 11/851,667, on Oct. 10, 2013 (13 pages).

* cited by examiner

BIPOD FLEXURE RING

CROSS REFERENCE TO RELATED APPLICATION

This patent arises from a continuation of U.S. patent application Ser. No. 12/783,599, filed May 20, 2010, entitled "Bipod Flexure Ring," which is a divisional of U.S. patent application Ser. No. 11/851,622, filed Sep. 7, 2007, now abandoned, entitled "Bipod Flexure Ring," both of which are hereby incorporated herein by reference in their entireties.

TECHNICAL FIELD

The present disclosure relates to couplings. More particularly, the present disclosure relates to a thermal coupling which is suitable for coupling a structure having a high CTE (coefficient of thermal expansion) to a structure having a low CTE.

BACKGROUND

In many applications, it is necessary to couple a structure having a high coefficient of thermal expansion (CTE) to a structure having a low CTE such as in the coupling of a metallic structure and a ceramic structure, for example. However, the thermal mismatch between such structures may induce high strains in the ceramic if the structures are rigidly joined when the structures are heated. These forces can easily influence the ceramic structure, precluding the coupling of ceramic and metallic structures to each other in elevated temperature applications.

SUMMARY

The present disclosure is generally directed to a thermal coupling. An illustrative embodiment of the thermal coupling includes a first structure having a first coefficient of thermal expansion; a second structure having a second coefficient of thermal expansion lower than the first coefficient of thermal expansion; a plurality of thermal expansion fingers provided in the first structure; a plurality of thermal expansion flanges extending from the plurality of thermal expansion fingers, respectively; and a flange extending from the second structure and attached to the plurality of thermal expansion flanges.

Another illustrative embodiment of the thermal coupling includes an attachment frame; a plurality of frame ribs extending from the attachment frame; a plurality of fastener rings provided on the plurality of frame ribs, respectively; and a plurality of fastener ring openings provided in the plurality of fastener rings, respectively.

BRIEF DESCRIPTION OF THE ILLUSTRATIONS

The disclosure will now be made, by way of example, with reference to the accompanying drawings, in which.

DETAILED DESCRIPTION

Figure 1:
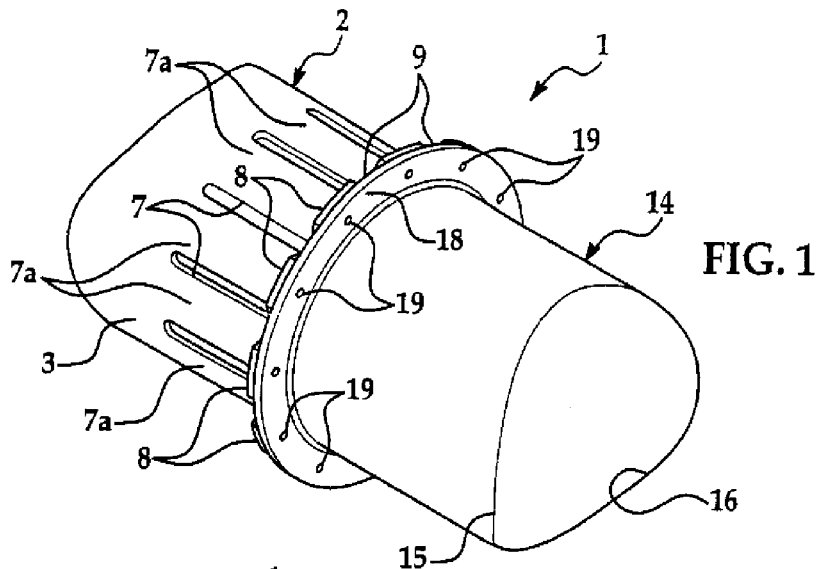
FIG. 1 is a partial sectional perspective view of an illustrative embodiment of the thermal coupling, attaching a structure having a high CTE to a structure having a low CTE.
Figures 2, 3:
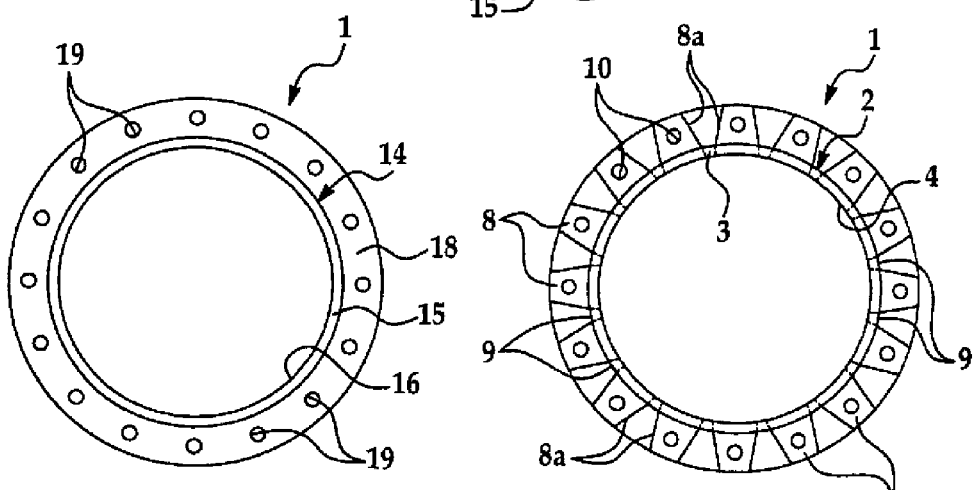
FIG. 2 is an end view of the low CTE structure side of the thermal coupling.
FIG. 3 is an end view of the high CTE structure side of the thermal coupling.

Referring to FIGS. 1-4 of the drawings, an illustrative embodiment of the thermal coupling is generally indicated by reference numeral 1. The thermal coupling 1 may couple a structure having a relatively high CTE (coefficient of thermal expansion) 2 to a structure having a relatively low CTE 14 and facilitate relative thermal expansion and retraction of the high CTE structure 2 with respect to the low CTE structure 14 during cyclic heating and cooling of the thermal coupling 1. The high CTE structure 2 may be a metal such as titanium, for example, and may include a high CTE wall 3 which defines a structure interior 4 (FIG. 3). The low CTE structure 14 may be ceramic and may include a low CTE wall 15 which defines a structure interior 16. The high CTE structure 2 has a coefficient of thermal expansion (CTE) which is higher than that of the low CTE structure 14.

Figure 4:
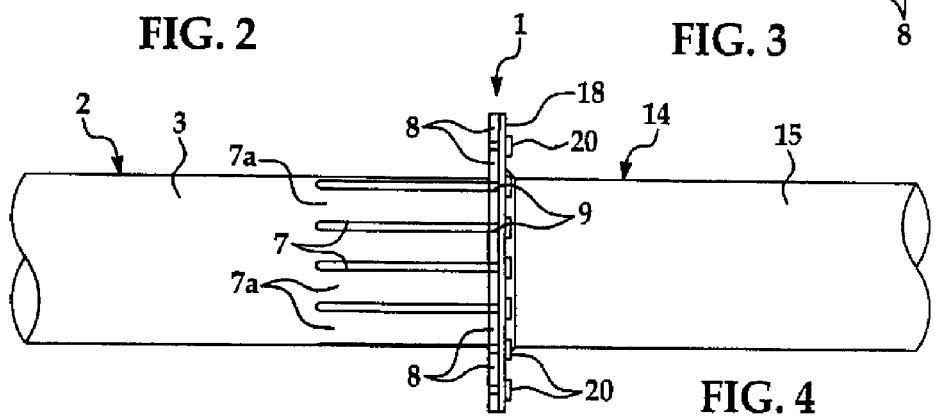
FIG. 4 is a side view of an illustrative embodiment of the thermal coupling and the high CTE structure and the low CTE structure connected via the thermal coupling.

As shown in FIGS. 1 and 4, the thermal coupling 1 may include multiple generally elongated, parallel thermal expansion slots 7 which extend through the high CTE wall 3 of the high CTE structure 2. The thermal expansion slots 7 may be disposed in generally parallel, spaced-apart relationship with respect to each other around the circumference of the high CTE structure 2. The longitudinal axis of each thermal expansion slot 7 may be oriented in generally parallel relationship with respect to a longitudinal axis of the high CTE structure 2. A thermal expansion finger 7a may be defined between each pair of adjacent thermal expansion slots 7.

Thermal expansion flanges 8 may extend from the respective thermal expansion fingers 7a. Each thermal expansion flange 8 may be oriented in generally perpendicular relationship with respect to the corresponding thermal expansion finger 7a from which the thermal expansion flange 8 extends. As shown in FIG. 3, each thermal expansion flange 8 may have a pair of scalloped or beveled flange edges 8a. A flange slot 9 may be defined between each adjacent pair of thermal expansion flanges 8. As further shown in FIG. 3, a fastener opening 10 may extend through each thermal expansion flange 8 for purposes which will be hereinafter described.

An annular flange 18 (FIG. 2), which may be continuous, may extend from the low CTE wall 15 of the low CTE structure 14. The flange 18 may be oriented in generally perpendicular relationship with respect to the longitudinal axis of the low CTE structure 14. Multiple, spaced-apart fastener openings 19 may extend through the flange 18. The fastener openings 19 may correspond in number and position to the fastener openings 10 provided in the respective thermal expansion flanges 8 on the high CTE structure 2. As shown in FIG. 4, flange fasteners 20 may extend through the fastener openings 19 in the flange 18 and the registering fastener openings 10 in the thermal expansion flanges 8, respectively, to attach the low CTE structure 14 to the high CTE structure 2.

In typical application, a fluid (not shown) having an elevated temperature flows through the high CTE structure 2 and the low CTE structure 14. Due to its higher CTE, the high CTE structure 2 may expand to a greater extent than the low CTE structure 14 upon heating due to flow of the typically hot fluid through the high CTE structure 2 and the low CTE structure 14. Accordingly, the thermal expansion slots 7 between the thermal expansion flanges 7a facilitate axial and radial expansion of the high CTE wall 3 of the high CTE structure 2 relative to the low CTE wall 15 of the low CTE structure 14. In like manner, the flange slots 9 between the thermal expansion flanges 8 facilitate radial expansion of the thermal expansion flanges 8 of the high CTE structure 2 relative to the flange 18 of the low CTE structure 14. The thermal coupling 1 may be capable of withstanding shear forces directed tangentially to the circumference of the thermal coupling 1 as well as loads which are directed parallel to the central axis of the thermal coupling 1. Therefore, thermal stresses between the high CTE structure 2 and the low CTE structure 14 during thermal cycling may be minimized, thus substantially preventing any possible change in the typically ceramic low CTE structure 14.

Figure 5:
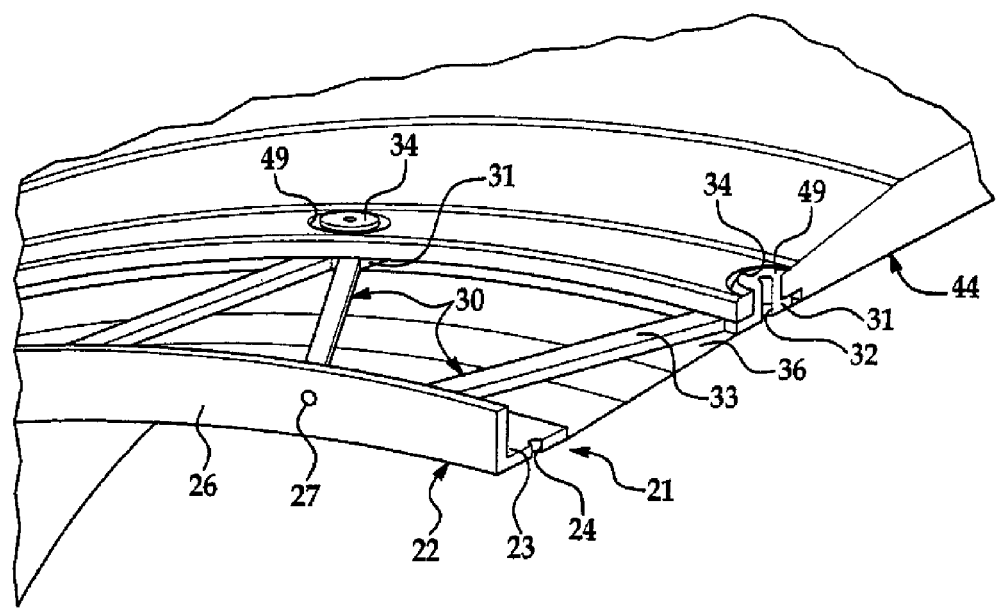
FIG. 5 is a perspective sectional view of an alternative illustrative embodiment of the thermal coupling, attached to an aircraft engine nozzle (partially in section).
Figure 6:
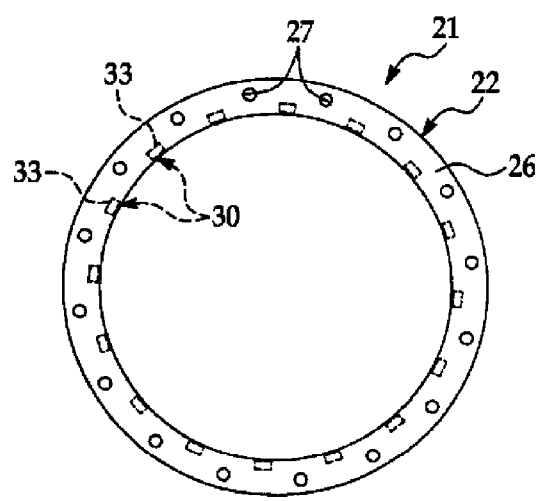
FIG. 6 is a front view of the alternative illustrative embodiment of the thermal coupling illustrated in FIG. 5.

Referring next to FIGS. 5 and 6 of the drawings, an alternative illustrative embodiment of the thermal coupling is generally indicated by reference numeral 21. The thermal coupling 21 is a scalloped ring or spaceframe structure including an attachment frame 22 which may be a material having a relatively high CTE (coefficient of thermal expansion). In some embodiments, the attachment frame 22 is a metal such as titanium, for example. The attachment frame 22 may include an annular frame ring 23. Multiple, spaced-apart fastener openings 24 (one of which is shown in FIG. 5) may extend through the frame ring 23. An annular frame flange 26 may extend from the frame ring 23, in generally perpendicular relationship with respect to the frame ring 23. Multiple, spaced-apart fastener openings 27 may extend through the frame flange 26.

As shown in FIGS. 5 and 6, multiple frame ribs 30 may extend from the attachment frame 22 in generally adjacent, spaced-apart relationship with respect to each other. Each frame rib 30 may include a pair of generally elongated rib members 33 which converge distally toward each other as they extend from the attachment frame 22. Each rib member 33 of each frame rib 30 may be oriented in generally parallel relationship with respect to the frame ring 23 and in generally perpendicular relationship with respect to the frame flange 26 of the attachment frame 22. A fastener ring 31 may be provided on the converging distal ends of the rib members 33. As shown in FIG. 5, a fastener ring opening 32 may extend through each fastener ring 31.

In typical application, the thermal coupling 21 connects a first structure (not shown) having a high CTE (coefficient of thermal expansion) to a second structure 44 having a relatively low CTE. The high CTE structure is attached to the high CTE attachment frame 22, whereas the low CTE structure 44 is attached to the fastener rings 31 of the frame ribs 30. The frame flange 26 on the high CTE attachment frame 22 may be attached to the high CTE structure by extending fasteners (not shown) through fastener openings (not shown) provided in the high CTE structure and through the registering fastener openings 27 provided in the frame flange 26. The fastener ring 31 on each pair of converging rib members 33 may be attached to the low CTE structure 44 by extending a rib fastener 34 through a rib fastener opening 49 provided in the low CTE structure 44 and through a registering fastener ring opening 32 provided in the fastener ring 31. As shown in FIG. 5, in some applications, a seal strip 36 may be provided between the frame ring 23 of the high CTE attachment frame 22 and the fastener rings 31 on the frame ribs 30.

When exposed to high temperatures, the relatively high CTE structure thermally expands relative to the relatively low CTE structure 44. The frame ribs 30 of the thermal coupling 21 facilitate radial and axial expansion of the high CTE structure relative to the low CTE structure 44 without the application of thermally-induced stresses to the low CTE structure 44. The thermal coupling 21 may be capable of withstanding shear loads directed at right angles with respect to the center axis of the thermal coupling 21 as well as fore and aft loads which are directed parallel to the central axis of the thermal coupling 21. Therefore, thermal stresses between the high CTE structure and the low CTE structure 44 during thermal cycling is minimized, thus substantially preventing any possible change in the low CTE structure 44 in cases in which the low CTE structure 44 is ceramic.

Figure 7:
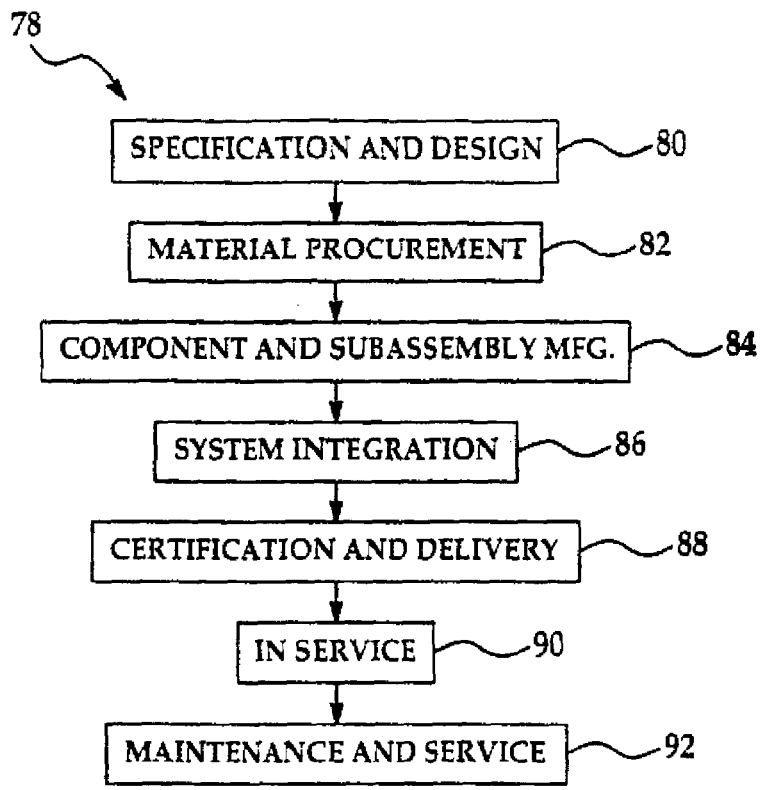
FIG. 7 is a flow diagram of an aircraft production and service methodology.
Figure 8:
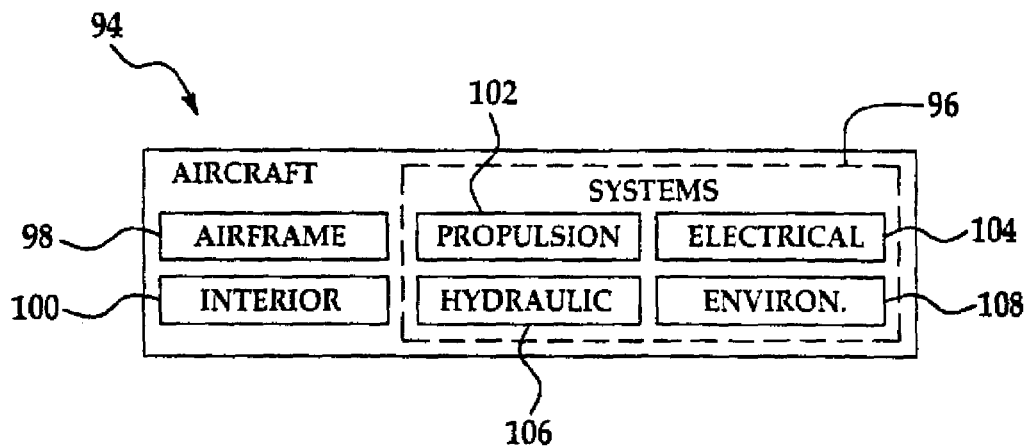
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although this invention has been described with respect to certain exemplary embodiments, it is to be understood that the specific embodiments are for purposes of illustration and not limitation, as other variations will occur to those of ordinary skill in the art.

What is claimed is:

1. An apparatus for use with a propulsion system, the apparatus comprising:
   an attachment frame to be coupled to a first end of a first structure having a first coefficient of thermal expansion, the attachment frame including a frame ring with a first plurality of spaced-apart fastener openings extending through the frame ring, the attachment frame further including a frame flange extending from the frame ring with a second plurality of spaced-apart fastener openings extending through the frame flange, the first and second plurality of spaced-apart openings to receive fasteners to couple the attachment frame to the first structure;

a plurality of fastener rings spaced apart from the attachment frame; and a plurality of frame ribs extending between the attachment frame and the fastener rings, wherein each frame rib includes members which converge to a respective one of the fastener rings, each of the fastener rings having a fastener ring opening extending through each fastener ring, each fastener ring to couple to a respective opening adjacent a second end of the second structure having a second coefficient of thermal expansion that is different than the first coefficient of thermal expansion, the coupling to facilitate expansion between the first and second structures in one or more of radial or axial directions with substantially reduced application of thermally induced stresses to the second structure.

2. The apparatus of claim 1, wherein each of the fastener ring openings extends substantially perpendicular relative to the frame ribs.

3. The apparatus of claim 1, wherein each frame rib has a substantially planar profile or shape along a longitudinal length of the frame rib between a first end of the frame rib and a second end of the frame rib.

4. The apparatus of claim 1, wherein the frame flange is disposed in generally perpendicular relationship with respect to the frame ring.

5. The apparatus of claim 1, wherein the frame ribs are distributed about a circumference of the frame flange.

6. The apparatus of claim 1, wherein the thermal coupling enables attachment of two similarly sized structures.

7. The apparatus of claim 1, wherein the second structure has a diameter substantially similar to a diameter of the first structure.

8. The apparatus of claim 1, wherein the converging frame rib members define a triangular shape.

9. The apparatus of claim 1, wherein the plurality of frame ribs are oriented generally parallel to the frame ring.

10. An apparatus for use with a propulsion system, the apparatus comprising:

an annular attachment frame to be coupled to a first structure having a first thermal coefficient of expansion, the attachment frame including a frame ring and a frame flange, each of the frame ring and frame flange having a plurality of spaced-apart fastener openings extending therethrough to receive fasteners to couple the attachment frame to the first structure;

a plurality of frame ribs extending from the attachment frame, wherein each frame rib includes a pair of rib members in angular relationship to one another, each pair of frame rib members to converge at respective distal ends of the respective frame rib; and a plurality of fastener rings, wherein a fastener ring from the plurality of fastener rings is positioned adjacent the converging distal ends of the rib members, each of the fastener rings having a fastener ring opening extending through each fastener ring, each fastener ring to couple to a respective opening adjacent a second end of a second structure having a second thermal coefficient of expansion that is different than the first thermal coefficient of expansion, the coupling to facilitate expansion between the first and second structures in one or more of radial or axial directions with substantially reduced application of thermally induced stresses to the second structure, wherein the plurality of frame ribs are oriented generally parallel relative to the frame.

11. The apparatus of claim 10, wherein each rib of the plurality of frame ribs is cantilevered from the attachment frame such that a cross-sectional profile taken along a longitudinal axis of the rib has a substantially planar profile.

12. An apparatus for use with a propulsion system, the apparatus comprising:

an attachment frame to be coupled to a first end of a first structure having a first coefficient of thermal expansion, the attachment frame further including a frame ring and a frame flange extending from the frame ring, each of the frame flange and the frame ring having a plurality of spaced-apart fastener openings extending therethrough to receive fasteners to couple the attachment frame to the first structure;

a plurality of fastener rings spaced from the attachment frame;

a plurality of frame ribs extending between the attachment frame and the fastener rings, the plurality of frame ribs forming respective gaps between respective ones of the frame ribs, wherein each frame rib includes a pair of frame rib members that converge to a respective one of the fastener rings, each of the fastener rings to couple the apparatus to the second structure having a second coefficient of thermal expansion different from the first coefficient of thermal expansion, the coupling to facilitate expansion between the first and the second structures in one or more of radial or axial directions with substantially reduced application of thermally induced stresses to the second structure; and a seal extending between the attachment frame and the fastener rings, the seal having a first end to be coupled to the attachment frame and a second end to be coupled to the fastener rings or the second structure to seal the gaps defined by the frame ribs.

* * * * *